United States Patent [19]

Koslov et al.

[11] Patent Number: 5,940,450
[45] Date of Patent: Aug. 17, 1999

[54] CARRIER RECOVERY METHOD AND APPARATUS

[75] Inventors: Joshua L. Koslov, Hopewell; Frank A. Lane, Medford Lakes, both of N.J.

[73] Assignee: Hitachi America, Ltd., Tarrytown, N.Y.

[21] Appl. No.: 08/807,565

[22] Filed: Feb. 28, 1997

[51] Int. Cl.[6] .................................................. H04L 27/06
[52] U.S. Cl. ...................... 375/344; 375/326; 375/329; 375/331
[58] Field of Search ..................................... 375/326, 327, 375/340, 329, 324, 334, 325, 371, 375, 344, 260

[56] References Cited

U.S. PATENT DOCUMENTS

| | | | |
|---|---|---|---|
| 4,308,505 | 12/1981 | Messerschmitt | 331/25 |
| 5,471,508 | 11/1995 | Koslov | 375/344 |
| 5,519,356 | 5/1996 | Grenberg | 375/344 |
| 5,519,733 | 5/1996 | Huang | 370/344 |
| 5,594,758 | 1/1997 | Petranovich | 375/344 |
| 5,799,037 | 8/1998 | Stroll et al. | 375/323 |

OTHER PUBLICATIONS

Neil K. Jablon, "Joint Blind Equalization, Carrier Recovery, and Timing Recovery for High–Order QAM Signal Constellations", IEEE Transactions on Signal Processing, vol. 40, No. 6, pp. 1383–1398, Jun. 1992.

Neil K. Jablon, "Joint Blind Equalization, Carrier Recovery, and Timing Recovery for 64–QAM and 128 QAM Signal Constellations", Record of IEEE International Conference on Communications (Boston, MA), Jun. 11–84, 1989, pp. 1043–1049.

Albert Benveniste and Maurice Goursat, "Blind Equalizers", Transactions on Communications, vol. Com–32, No. 8, pp. 871–883, Aug. 1984.

*Primary Examiner*—Chi H. Pham
*Assistant Examiner*—Bayard Emmanuel
*Attorney, Agent, or Firm*—Michaelson & Wallace; Peter L. Michaelson; Michael P. Straub

[57] ABSTRACT

Improved carrier recovery methods and apparatus suitable for use with QAM, QPSK and a wide variety of other modulation formats is described. In accordance with the invention, the phase error between received symbols, representing a frequency error, is determined using one of a plurality of techniques. The estimated frequency error is used to adjust the phase and/or frequency of a received carrier signal to achieve a frequency lock. The methods and apparatus of the present invention can be easily integrated into existing carrier recovery designs to supplement known frequency In accordance with a first embodiment of the present invention, the receipt of pairs of consecutive outer symbols is detected, a frequency error associated with each pair of consecutive symbols is generated, and the frequency error is compared to a selected threshold value to determine if it is a non-ambiguous estimate of the frequency error. If the frequency error is non-ambiguous and from a pair of consecutive outer symbols, it is used to adjust the frequency and/or phase of a received carrier signal. In the second embodiment, the receipt of pairs of consecutive outer symbols are detected. An estimate of the frequency error, determined as the phase error between received symbols, is made in the second embodiment by doing a symbol to symbol, as opposed to a symbol to target comparison.

26 Claims, 7 Drawing Sheets

CARRIER RECOVERY METHOD AND APPARATUS

FIELD OF THE INVENTION

The present invention is directed to carrier recovery methods and apparatus and, more particularly, to improved carrier recovery methods and apparatus suitable for use in, e.g., QAM (quadrature amplitude modulation) and/or QPSK (quadrature phase shift keying) demodulators.

BACKGROUND OF THE INVENTION

The transmission of various types of information as digital data continues to grow in importance. Quadrature amplitude modulation (QAM) and Quadrature phase shift keying (QPSK) are increasingly seeing use as an attractive vehicle to transmit digital data.

As will be discussed in detail below, the carrier recovery methods and apparatus of the present invention may be used with QAM, QPSK and a variety of other types of modulated signals. For purposes of explanation, the methods and apparatus of the present invention will be explained in the context of an exemplary QAM demodulator embodiment. QAM and known QAM carrier recovery will now be briefly discussed.

In essence, QAM relies on transmitting data as a sequence of two-dimensional complex symbols, i.e. with both in-phase and quadrature components. Each symbol, based upon the data it represents, takes on a specific pre-defined value. A set of all of the values available for transmission defines an alphabet which, when graphically plotted, typically on a two-dimensional basis, forms a constellation. The size and shape of the constellation depends upon the number of discrete values in the set and their spatial location in the constellation. The constellation frequently proposed for use in broadcasting, e.g., high definition television (HDTV) data contains, e.g., 16, 32 or 64 values (states), hence so-called 16, 32 or 64 QAM, respectively.

Figure 1:
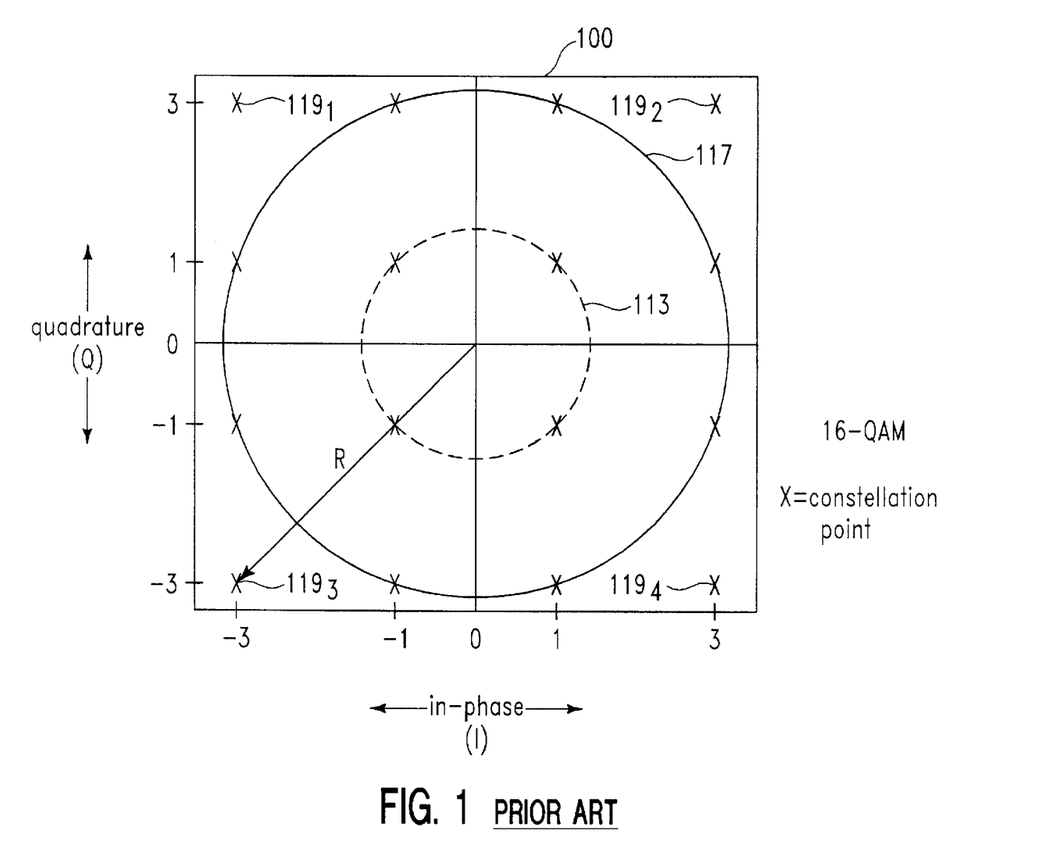
FIG. 1 is a diagram illustrating a 16 QAM constellation.

FIG. 1 illustrates a 16-QAM constellation. Each symbol in the constellation is denoted by an "x". In known 16 QAM the permissible nominal symbol values for both the x and y coordinates is (±1, ±3) with the nominal squared magnitudes being approximately 2, 10 and 18. Constellation 110 ordinarily contains three rings corresponding to the squared symbol magnitudes 2, 10, 18, of which only the inner most and middle rings 113, 117, respectively, are specifically shown.

To receive broadcast QAM data, a QAM receiver essentially samples and filters a received output of a communication channel, and applies resulting filtered samples to a decoder (e.g. a Viterbi decoder), which contains one or more slicers, to yield detected symbols. The data contained in these latter symbols, if it contains compressed video information, is then appropriately decompressed to yield original source video data. To specifically accomplish QAM reception, a QAM demodulator within the receiver performs the functions of timing recovery, equalization and carrier recovery.

In QAM and QPSK carrier recovery is typically performed on a decision directed basis and in the absence of a pilot tone. Carrier recovery creates a reference carrier against which in-phase and quadrature modulated components may be determined, e.g., both in terms of frequency and phase, such that the received demodulated symbols do not rotate. It is the carrier signal that is quadrature modulated by the symbols and then transmitted to a receiver. Carrier recovery must be able to properly function in the presence of varying frequency offsets, e.g., drift or jitter that often occur between a transmitter and receiver. The input to a carrier recovery circuit is normally equalized symbols.

Figure 2:
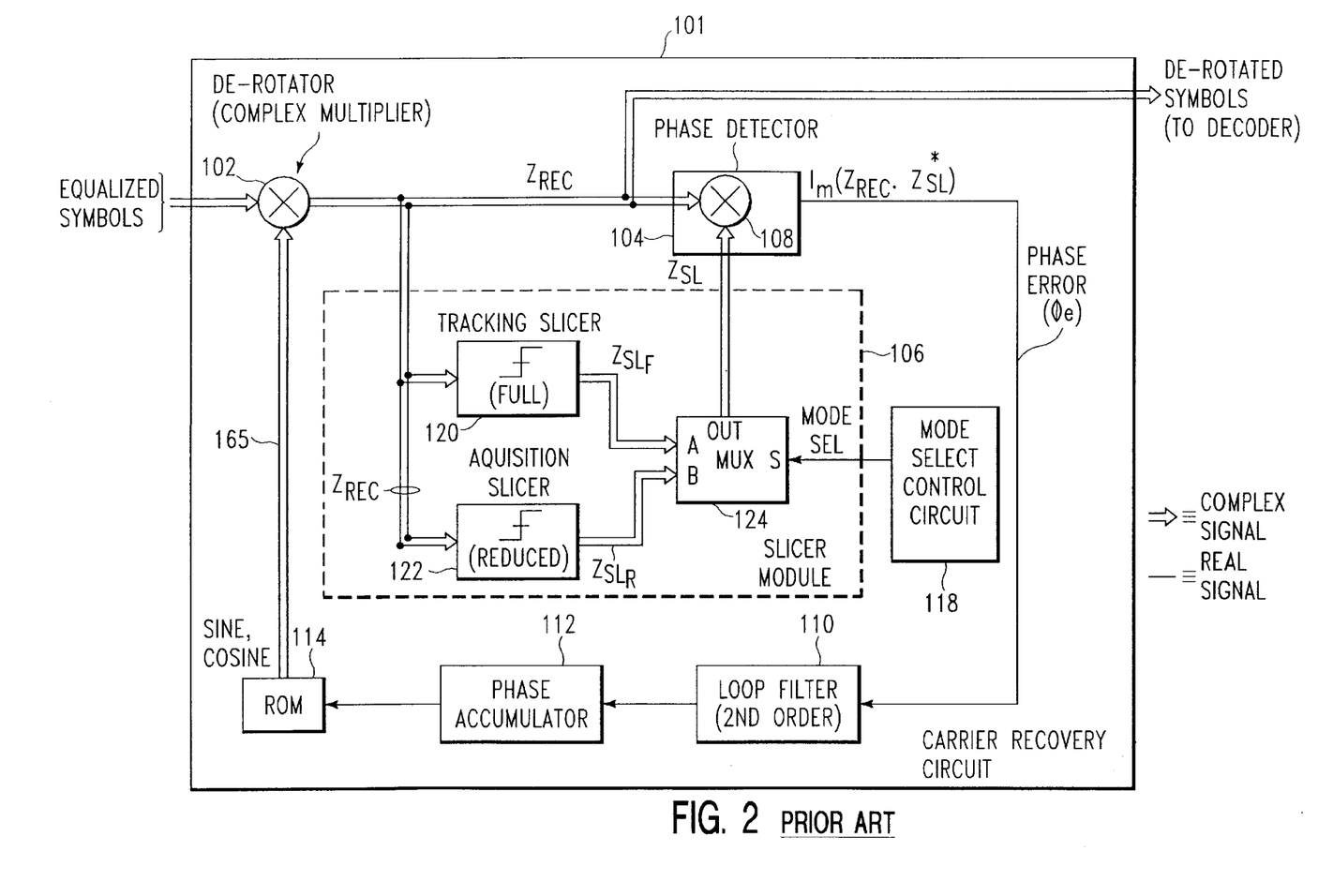
FIG. 2 illustrates a known carrier recovery circuit.

FIG. 2 illustrates a known carrier recovery circuit 101. As illustrated the carrier recovery circuit 101 includes a de-rotator 102, a phase detector 104, loop filter 110, phase accumulator 112, ROM 114 for storing a SINE, COSINE lookup table, and a slicer module 106. A mode select control circuit 118 is also included to control switching between acquisition and tracking modes of operation. The carrier recovery circuit 101 may be the same as, or similar to, that described in U.S. Pat. No. 5,471,508 which describes one of Applicant's earlier inventions in detail. In the illustrated embodiment, the slicer module 106 operates, in response to a control signal output by the mode select control circuit 118, in either an acquisition or tracking mode. In carrier recovery circuits which do not support distinct tracking and acquisition modes of operation the acquisition module 122 is omitted from the slicer module 106 and the mode select control circuit 118 is also omitted.

As will be discussed below, various embodiments of the present invention can be used with carrier recovery circuits which support such distinct, e.g., acquisition and tracking, modes of carrier recovery operation as well as carrier recovery circuits which support only a single, e.g., tracking, mode of operation.

In the carrier recovery circuit 101, carrier recovery is performed through the use of a digital phase-locked loop (DPLL) in which a reference carrier, on leads 165, is fabricated for use in de-rotating incoming equalized symbols. To assure that the reference carrier is accurate, i.e. this carrier properly responds in the presence of jitter in the received signal or frequency and/or phase shifts between the transmitter and receiver, and thus can be used to properly de-rotate the equalized symbols, this carrier is adjusted, in terms of both a frequency and phase, within the DPLL based on an estimate of the phase error ($\phi_e$) that occurs between each de-rotated symbol and its corresponding ideal sliced value.

Specifically, incoming equalized symbols are applied to a first input of de-rotator 102 while quadrature outputs of a sine generator, specifically the sine, cosine table stored in read only memory (ROM) 114, are applied to a second input of the de-rotator 102. For any input to the table 114, the corresponding sine output produces the in-phase component of the reference carrier; the corresponding cosine output produces the quadrature component of this carrier. The input address to ROM 114 is an integrated phase error generated by the phase accumulator 112.

The phase error signal is first synthesized by estimating the phase error between each incoming equalized de-rotated symbol ($Z_{REC}$) and its corresponding ideal sliced value therefor ($Z_{SL}$). In particular, each de-rotated symbol produced by de-rotator 102 is supplied to a first input of the phase detector 104 and to the input to the slicer module 106. The phase detector 104 is implemented using a half-complex multiplier 108.

In the illustrated embodiment, slicer module 106 includes a full slicer 120 and a reduced slicer 122. The full slicer generates an output for each of the received symbols by comparing them to the full set of 16 possible ideal values (in the case of 16 QAM) and selecting the one of the 16 possible ideal values closest to the input symbol value, as the full slicer's output. The reduced slicer 122 generates ideal sliced value outputs for outer, i.e., non-inner, symbols, e.g., outer corner symbols $119_1$, $119_2$, $119_3$, $119_4$, and outputs a zero as the sliced value ($Z_{REC}$) when an inner symbol is received.

The reduced slicer 122 can be implemented by first comparing the magnitude of received symbol to a preselected threshold value to determine if is an outer symbol. When the threshold is not exceed, indicating a received symbol is an inner symbol a zero is output. However, if a received symbol is determined to be an outer symbol, it is compared to a reduced set of ideal symbol values, e.g., four when only the outer four points are being used for acquisition purposes, and the closest matching value is output. In such an embodiment, during acquisition mode when the reduced complexity slicer is used, the estimated phase error will be zero for received inner symbols. In such an embodiment, the received inner symbol will have little or no effect on constellation positioning.

As discussed in U.S. Pat. No. 5,471,508 outer symbols have a longer radii and thus a larger signal to additive-plus-adaptive noise ratio than inner symbols. Theory suggests that, for this reason, outer symbols generally provide more reliable information regarding the current orientation of the constellation than inner symbols. By using only such outer symbols for phase error estimates when the ambiguity regarding phase errors are the highest, e.g., during acquisition mode, faster lock on can be achieved as compared to the case where both the less reliable phase error estimates generated from inner symbols and the more reliable phase error estimates generated from outer symbols are used for correction purposes, e.g., in the case where only a single mode of carrier recovery is supported.

A multiplexer 124, which is responsive to a mode select signal generated by the mode select control circuit 118 is used to control whether the output of the full or reduced slicer 120, 122 is supplied to the second input of the phase detector 108 at any given time. The mode select control circuit 118, which controls, via the MUX 124, switching between acquisition and tracking slicer modes of operation, may be implemented using any one of a plurality of known techniques.

The output of the phase detector 104, the estimated phase error ($\phi_e$) between each de-rotated symbol and its corresponding sliced value, is calculated as being an imaginary part of the complex product of the equalized de-rotated symbol and the conjugate ($Z_{sl}^*$) of the sliced value($Z_{sl}$). That is:

$$\phi_e = Im(Z_{REC} Z_{SL}^*) = |Z_{REC}||Z_{SL}^*|\sin((\phi_{REC}-\phi_{SL})) \approx |Z_{REC}|^2 \phi_{ae}$$

where $\phi_{ae}$ is the actual phase error as opposed to the estimated phase error ($\phi_e$);

$\phi_{REC}$ is the phase of the received symbol; and $\phi_{SL}$ is the (desired) phase of the sliced symbol.

In the known system of FIG. 2, the scalar phase error ($\phi_e$) is applied to an input of second-order loop filter 110 and, from there, to phase integrator (accumulator) 112. A resulting integrated (accumulated) phase error output by the phase accumulator 112 is applied as the input to ROM 114 which is responsible for generating the second input to the de-rotator as discussed above.

While known carrier recovery circuits such as that illustrated in FIG. 2 provide satisfactory carrier recovery under most conditions, such systems may still find it difficult and relatively time consuming to pull in extremely large frequency offsets, e.g., such as those that may be encountered where a large amount of signal jitter and/or poor signal transmission conditions exist, in a reasonable amount of time. This is because the phase detector output must have a significant biased DC component over a period of time which the second order accumulator can integrate to thereby generate an accurate frequency error signal.

Accordingly, there is a need for improved carrier recovery circuits which can achieve a frequency lock in less time than existing carrier recovery circuits, particularly where large frequency errors exit. It is desirable that any such improved carrier recovery circuits be relatively easy to implement. It is also desirable, at least in some cases, that the improved carrier recovery circuits be capable of being easily combined with existing carrier recovery circuits thereby avoiding the need to entirely redesign various existing circuits. For maximum versatility, it is also beneficial that any improved carrier recovery techniques be suitable for use with multiple modulation schemes.

SUMMARY OF THE PRESENT INVENTION

The present invention relates to improved carrier recovery methods and apparatus. Unlike conventional phase error detection techniques which are directed to the estimation of phase errors between a received symbol and a target or sliced symbol, the present invention is directed to the detection and estimation of the phase error between consecutive received symbols. Since the estimated phase error is a difference of phase errors calculated over a period of time, e.g., two symbol time periods, it represents a carrier frequency error, i.e., it is an estimation of the error between the frequency of the received signal and the actual carrier frequency. This frequency error is determined using one of a plurality of techniques.

The estimated frequency error generated in accordance with the present invention is used to adjust the phase and/or frequency of a received carrier signal. The frequency error estimation techniques of the present invention can be used with a variety of modulation methods including QAM and QPSK modulation. Furthermore, the methods and apparatus of the present invention can be easily integrated into existing carrier recovery designs to supplement known frequency and phase error correction techniques.

By using the phase and frequency error estimation and correction techniques of the present invention, in combination with existing phase error estimation and correction techniques, large frequency offsets can often be quickly pulled in even when the output of a conventional phase detector has a very small DC component.

In accordance with a first embodiment of the present invention, the receipt of pairs of consecutive outer symbols is detected, a frequency error associated with each pair of consecutive symbols is generated, and the frequency error is checked to determine if it is a non-ambiguous estimate of the frequency error. If the frequency error is non-ambiguous, and from a pair of consecutive outer symbols, it is used to adjust the frequency and/or phase of a received carrier signal in an attempt to achieve or maintain a frequency lock with the received carrier signal. This may be done by supplying the frequency error signal to an input of a second order filter, the output of which is used, directly or indirectly, to control the phase and/or frequency of the received carrier signal.

In the first embodiment, the detection of the receipt of a pair of consecutive outer symbols is performed in parallel with the frequency error estimation step. The receipt of a pair of consecutive outer symbols is detected by comparing the received magnitude of the received symbols to a preselected threshold value used to distinguish between inner and outer symbols. Outer symbols are used for frequency error estimation purposes while inner symbols are not. The frequency error between outer symbols is calculated, in one embodiment of the present invention, by subtracting a phase error associated with the second symbol in a pair of outer symbols from a phase error associated with the first symbol in the pair of consecutive outer symbols.

In accordance with a second embodiment of the present invention, the frequency error between consecutive symbols is once again determined. However, in accordance with the frequency error estimation technique of the second embodiment, the phase error output by a phase detector is not used for purposes of frequency error estimation. Accordingly, the second embodiment does not require use of the output of a slicer for frequency error estimation purposes. As with the first embodiment, the second embodiment may include an outer symbol detection circuit and limit the frequency error estimates to estimates associated with pairs of consecutively received outer symbols. As with the first embodiment, the frequency error signal generated by the second embodiment may be used directly or indirectly, to control and correct the phase and/or frequency of the received carrier signal.

The various frequency error detection techniques of the present invention can be used alone or in combination with conventional phase error and/or frequency error correction techniques. Furthermore, because the frequency error estimation and correction methods of the present invention are relatively easy to implement and can be readily incorporated into many existing carrier recover designs, they are well suited for a wide variety of carrier recovery applications.

Many other features and embodiments of the present invention are described in detail below.

DETAILED DESCRIPTION

As discussed above, the present invention relates to improved carrier recovery methods and apparatus. In accordance with the present invention a phase error between received symbols, e.g., outer symbols, which represents a carrier signal frequency error is calculated using new and novel techniques. In accordance with the present invention this frequency error is used, either alone or in combination with other frequency or phase error estimates, generated e.g., using known techniques, to adjust the frequency and/or phase of the received carrier signal.

Figure 3:
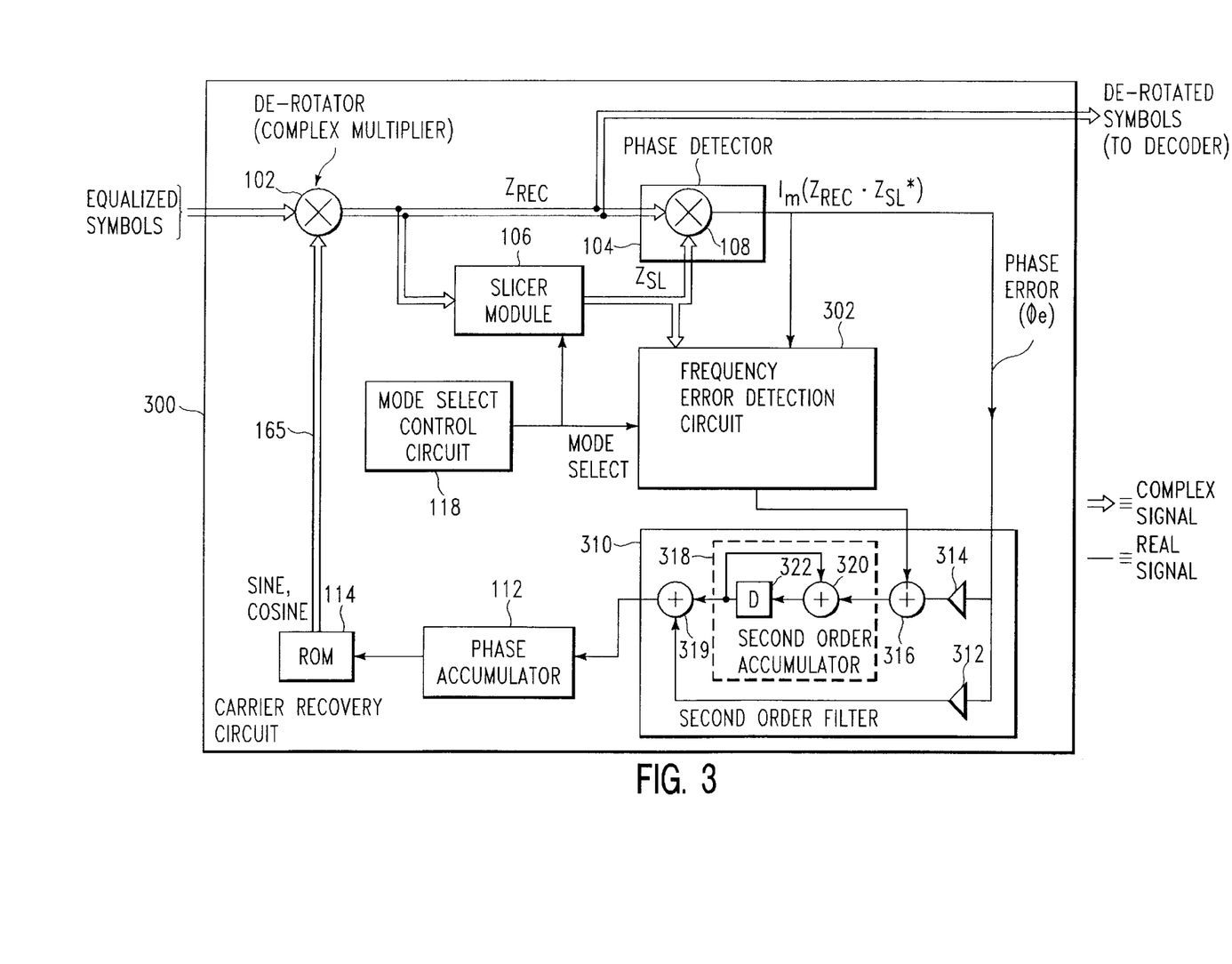
FIG. 3 is a block diagram of an improved carrier recovery circuit implemented in accordance with a first exemplary embodiment of the present invention.

A first embodiment of the present invention will now be described with reference to FIG. 3. As discussed above, it is desirable that new improved carrier recovery methods and apparatus be capable of being easily combined with existing carrier recovery designs to avoid having to totally redesign carrier recovery circuits. FIG. 3 illustrates a carrier recovery circuit implemented in accordance with a first embodiment of the present invention which is particularly well suited for use with existing carrier recovery circuit designs. As will become apparent from a review of FIGS. 2 and 3, the carrier recovery circuit of the present invention, illustrated in FIG. 3, bears many similarities to the carrier recovery circuit 101 of FIG. 2. Notably, however, the FIG. 3 embodiment differs from the known embodiment by the presence of a new and novel frequency error detection ("FED") circuit 302 implemented in accordance with the present invention. In addition, the second order filter circuit 310 used in the FIG. 3 embodiment, differs from the filter circuit 110 in that the filter circuit 310 is designed to receive both the frequency error signal generated by the FED circuit 302 and the phase error signal output by the phase detector 104. Components of the FIG. 3 carrier recovery circuit 300 which are the same as, or similar to, those of the known carrier recovery circuit 101, will not be described again in detail for purposes of brevity.

As illustrated in FIG. 3, the FED circuit 302 of the present invention receives as its inputs the estimated phase error signal output by the phase detector 104 and the mode select signal generated by the mode select control circuit 118 and the sliced symbols. As will be discussed in greater detail below, during acquisition modes of operation, the FED circuit 302 1) detects the receipt of consecutive outer symbols, 2) estimates the frequency error associated with each pair of sequentially received outer symbols; and 3) determines if the calculated frequency error is ambiguous. If the estimated frequency error is determined to be ambiguous the FED circuit 302 outputs a zero value which is supplied to a first input of the second order filter 310. However, if the estimated frequency error is determined to be reliable, it is supplied to the first input of the second order filter 310 and is used in generating the phase accumulator input signal. As illustrated, the second order filter 310 also receives as an input, the estimated phase error signal. This signal is also used when generating the input to the phase accumulator 112.

By utilizing the frequency error signal generated by the FED circuit 302 to supplement existing phase error correction techniques, large frequency offsets can be pulled in, in less time then would normally be required. By virtue of using second-order filtering inherent in loop filter 310, the DPLL implemented in circuit 300 can attain a phase lock on a constellation formed of equalized symbols without a steady-state (D.C.) phase offset as a function of input frequency offset, as would otherwise occur in the case of a first-order loop filter.

Figure 4:
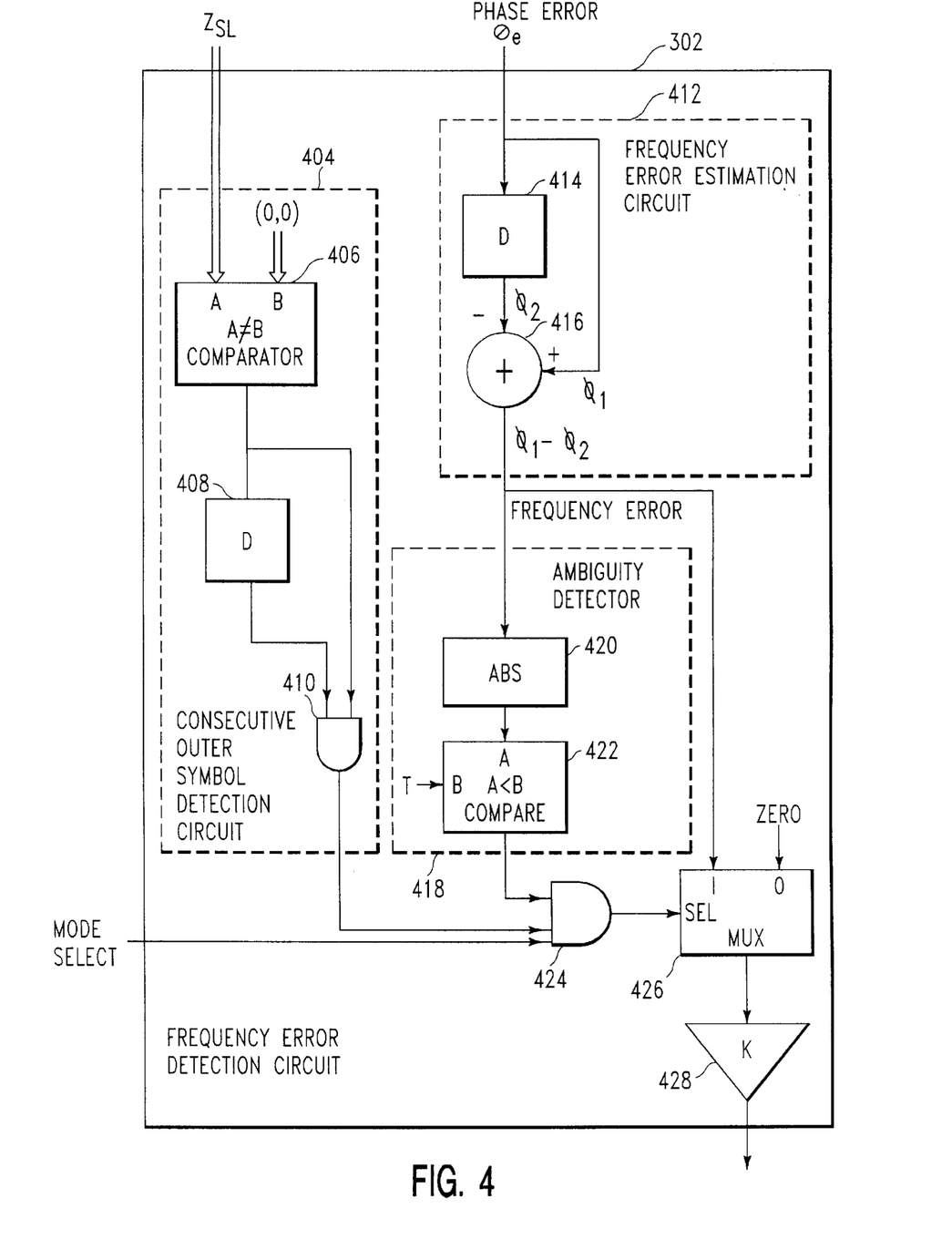
FIG. 4 is a block diagram of a frequency error detection circuit of the present invention suitable for use with the carrier recovery circuit illustrated in FIG. 3.

The FED circuit 302, implemented in accordance with a first exemplary embodiment of the present invention will now be discussed in detail with reference to FIG. 4. The FED circuit 302 includes a consecutive outer symbol detection circuit 404, a frequency error estimation circuit 412, an ambiguity detector 418 and control logic including an AND gate 424 and a multiplexer ("MUX") 426. The control logic and MUX 426 are used in combination with the other circuitry to determine when the calculated frequency error is to be used, e.g., output by the frequency error detection circuit 312. A gain element 428 is also included in the FED circuit 302, to control the gain of the frequency error signal and thus the amount of contribution the generated frequency error signal will have to the ultimate frequency and phase corrections which are made in response thereto.

For the reasons discussed above, when a constellation is rotating, it is not possible to make a good estimation of the phase error based upon a fully sliced decision directed system. However, outer received symbols may provide useful phase error information, even in the presence of relatively large phase offsets and regardless of the state of equalization. In fact, even before a rotating constellation is fully equalized and the carrier recovered, in accordance with the present invention, one can estimate a useful frequency offset using outer received symbols in many instances.

In accordance with the present invention, the estimated phase error signals generated by the slicer module 106 for consecutively received outer symbols is used to generate a frequency error signal that is an estimate of the carrier phase error over a two symbol time period. This operation is performed by the frequency error estimator circuit 412. The circuit 412 subtracts, from the phase error associated with a current symbol $\phi_1$, the phase error associated with an immediately preceding symbol $\phi_2$.

The frequency error estimation circuit 412 includes a delay element 414 and a summer 416. The delay element 414 receives as its input the estimated phase error signal ($\phi_e$) which it outputs one sample period later to a subtracting input of the summer 416. In addition to receiving the delayed phase error signal $\phi_2$ output by the delay element 414, the summer 416, receives at a summing input, the current phase error signal $\phi_1$ supplied to the input of the delay element 414. The summer 416 operates to subtract from the phase error $\phi_1$ associated with a current symbol, the phase error $\phi_2$ associated with the immediately preceding symbol. In this manner the summer 416 produces the desired frequency error signal.

As discussed above, the phase error for inner symbols can't be reliably estimated in many cases, and particularly during acquisition mode where large phase errors tend to exist. For this reason, phase error estimates are not made for inner symbols during acquisition mode operation. Thus, if consecutive outer symbols, e.g., symbols other than the inner most symbols, are not received, it is not possible to reliably determine the frequency error between two symbols by subtracting the estimated phase error for each of the received symbols.

The consecutive outer symbol detection circuit 404 is responsible for detecting the receipt of two consecutive outer symbols, i.e., the condition required for accurate frequency error estimates to be generated by the frequency error estimation circuit 412. As discussed above, the slicer module 106 implements a reduced constellation slicing algorithm during acquisition mode operation. This results in the output of the value (0,0) as the sliced symbol value ZSl whenever an inner symbol is received. Since the slicer module 106 outputs a known predictable value whenever an inner symbol is received, the value of the slicer module's output may be examined to determine if an inner or outer symbol is being processed at any given time by the frequency error detection circuit 302.

As illustrated, the consecutive outer symbol detection circuit 404 includes a first comparator 406 which is responsible for comparing the sliced symbol value $Z_{sl}$ to the known value, in this case (0,0), indicative of the receipt of a non-outer, e.g., inner symbol. When the value of the input signal $Z_{sl}$ fails to match that of the known value (0,0), it indicates that an outer symbol has been received and the output of the comparator 406 is asserted. However, when $Z_{sl}$ matches the value (0,0) it indicates that an inner symbol is being processed and that any frequency error estimate generated using that value is not reliable and should not be used.

The output of the comparator 406 is coupled to a unit delay element 408 which, in turn, has an output coupled to a first input of an AND gate 410. A second input of the AND gate 410 is coupled directly to the output of the comparator 404. Since the AND gate 410 receives as its inputs the current output of the comparator 406, and the previous output of the comparator 406, the output of the AND gate 410 will only be high when the current symbol and the previous received symbol are outer symbols. Thus, the output of the consecutive outer symbol detection circuit 404 is a consecutive outer symbol detection signal which will be high when consecutive received symbols are outer symbols but low in other cases.

The output of the frequency error estimation circuit 412 is coupled to the input to the ambiguity detector circuit 418. The ambiguity detection circuit's purpose is to detect when the estimated frequency error's value is outside of a non-ambiguous range, e.g., a range where the direction in which to pull the carrier can be accurately determined. The maximum frequency error that can be accurately discerned, using no other aids, by subtracting the phase error associated with two consecutive outer symbols is equal to the symbol rate divided by eight. At frequency errors greater than that, there is an ambiguity in which way the carrier should be pulled to achieve a frequency lock. For example, if the received signal differs in frequency by the symbol rate divided by four, a QAM constellation will appear to lock up properly but, in fact, there will be an extra rotation of one-fourth of a cycle ($\pi/2$) from one symbol to the next. This will result in erroneous data extraction, even if differential encoding is used. Hence, the detectable and correctable frequency excursion using the symbol phase error subtraction technique of the present invention is $+/-(\pi/4)$ radians/symbol corresponding to a carrier frequency offset of one-eighth of the symbol rate.

As discussed above the maximum detectable phase error using the known reduced-constellation slicing and phase error detection algorithm is equal to $+/-(\pi/4)$ radians. Accordingly, the maximum estimated frequency error using the symbol phase error subtraction technique of the present invention could be as much as $+/-(\pi/2)$ radians.

Consider, for example, the case where:

$\phi_1 = \pi/4$;

$\phi_2 = -\pi/4$;

$\omega_{est} = \pi/2$; and where $\phi_1$ is the phase error estimate of the current symbol, $\phi_2$ is the phase error estimate of the previouos symbol, and $\omega_{est}$ is the estimated frequency error in radians per symbol generated by the frequency error estimation circuit 412 by performing the operation ($\phi_1 - \phi_2$).

In such a case, the frequency error of $\pi/2$ should be ignored since it exceeds the unambiguous upper limit of $+/-(\pi/4)$ radians/symbol.

The ambiguity detector 418 includes an absolute value circuit (ABS) 420 for taking the absolute value of the frequency error signal output by the frequency error estimation circuit and supplying the absolute value to a first input of a comparator 422. The comparator 422 compares the absolute value of the estimated frequency error to a preselected threshold, T. The threshold T corresponds to the value, e.g., ($\pi/4$), where the frequency error estimate becomes ambiguous and should not be used if equaled or exceeded. The output of the comparator 422, which serves as the output of the ambiguity detector 418, is coupled to an input of the AND gate 424.

The AND gate 424 is used to determine when the frequency error signal generated by the frequency error estimation circuit 412 is to be output by the frequency error detection circuit 302 and used in adjusting the received carrier signal. The AND gate receives as its inputs the mode select signal, the consecutive outer symbol detection circuit output signal and the ambiguity detector output signal. Only when all three of these signals are high indicating that the carrier recovery circuit is in acquisition mode operation, that the frequency error signal has been generated from the phase error associated with two consecutive outer symbols, and that the frequency error signal has a non-ambiguous value, will the output of the AND gate 424 be asserted.

The output of the AND gate 424 is coupled to a control input of the MUX 426. The MUX 426 receives at a first input, the frequency error signal output by the frequency error estimation circuit 412. It also receives, at a second input, the value zero. When the output of the AND gate 424 is asserted, indicating that the generated frequency error signal should be used, the MUX 426 outputs to the multiplier 428, the frequency error signal. However, when the output of the AND gate 424 is low, indicating that the generated frequency error signal should not be used, the MUX 424 outputs the zero value supplied to its second input.

The multiplier 428 applies a preselected gain K to the signal output by the MUX 426 to properly scale the frequency error signal before it is supplied to the second order loop filter 310.

As an alternative to using the multiplier 428, a signal detection circuit may be employed. In such an embodiment, the output of the signal detection circuit is used to determine whether a fixed value is added or subtracted to the input of the second order filter 310. In this manner, the input to the second order filter 310 is incremented up or down by a fixed increment in response to the polarity of the frequency error estimate.

As discussed above, the first frequency error estimation technique relies on sliced symbol values resulting from a received symbol to target comparison and the phase error that may be generated therefrom to produce the desired frequency error signal used for adjusting the phase and/or frequency of the carrier signal.

Unlike the first embodiment of the present invention, the second embodiment which will now be discussed with reference to FIGS. 4 through 6, does not require or utilize the output of a slicer for frequency error estimation. Rather, the second embodiment of the present invention generates a frequency error estimate by examining symbol to symbol, as opposed to symbol to target, phase errors. The second embodiment is particularly well suited for both QPSK and QAM carrier recovery applications.

Figure 5:
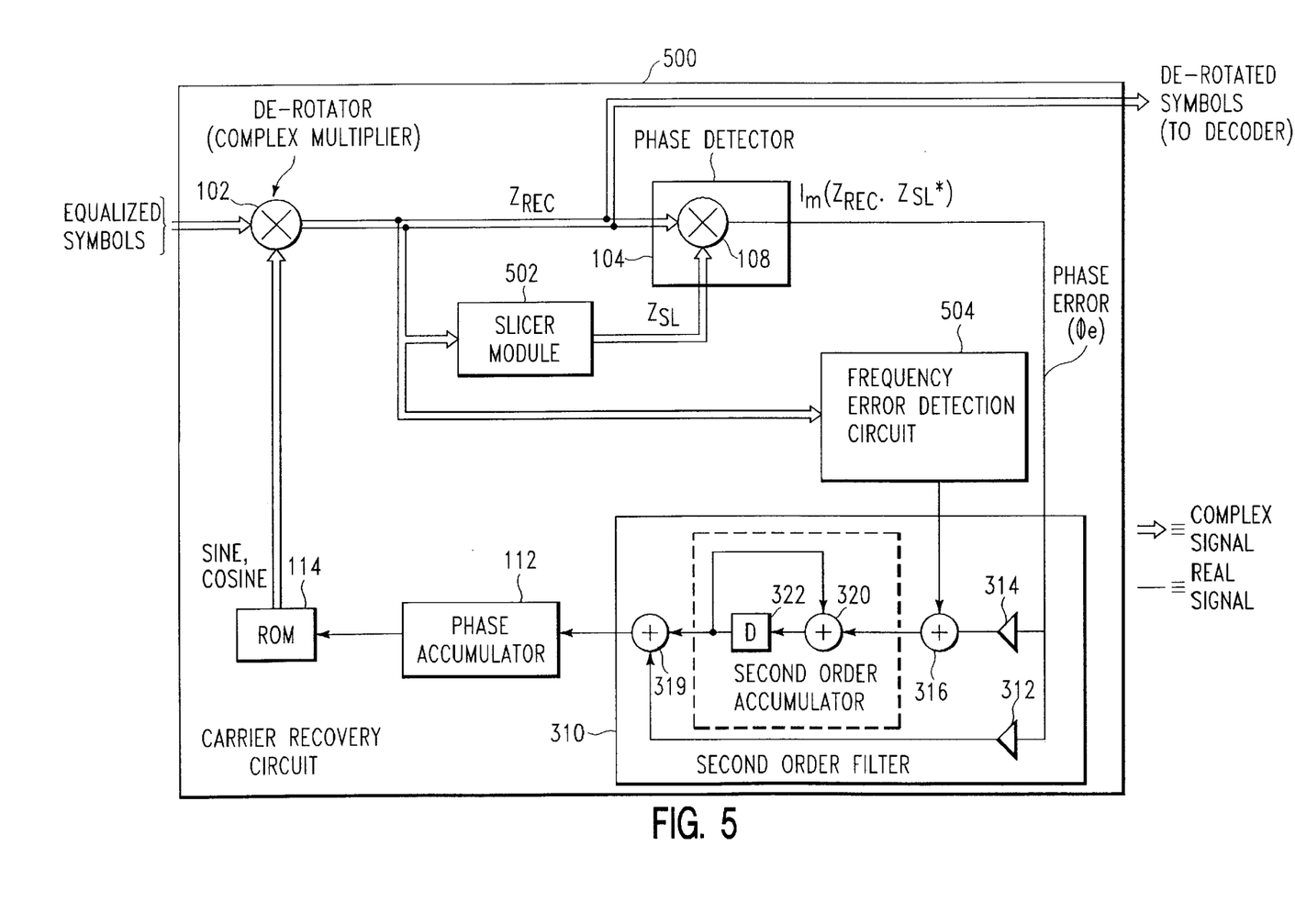
FIG. 5 is a block diagram of an improved carrier recovery circuit implemented in accordance with a second exemplary embodiment of the present invention.

Referring now to FIG. 5, there is illustrated a carrier recovery circuit 500 implemented in accordance with the second embodiment of the present invention. As will become apparent, the carrier recovery circuit 500 includes many elements which are the same as, or similar to, those found in previously described figures. Such elements bear the same reference numbers as previously described elements and will not again be described in detail. Note that FIG. 5 differs from previous figures in that it incorporates a FED circuit 504 implemented in accordance with the second embodiment of the present invention and a slicer module 502 that may, but need not, include a reduced complexity slicer.

As illustrated, the frequency error detection circuit 504 is coupled to the output of the de-rotator 102 and receives as its input the de-rotated received symbols $Z_{REC}$. The frequency error detection circuit 504 has an output coupled to a summer input of the second order filter 310 to thereby supply the second order filter 310 with the generated frequency error signal.

Figure 6:
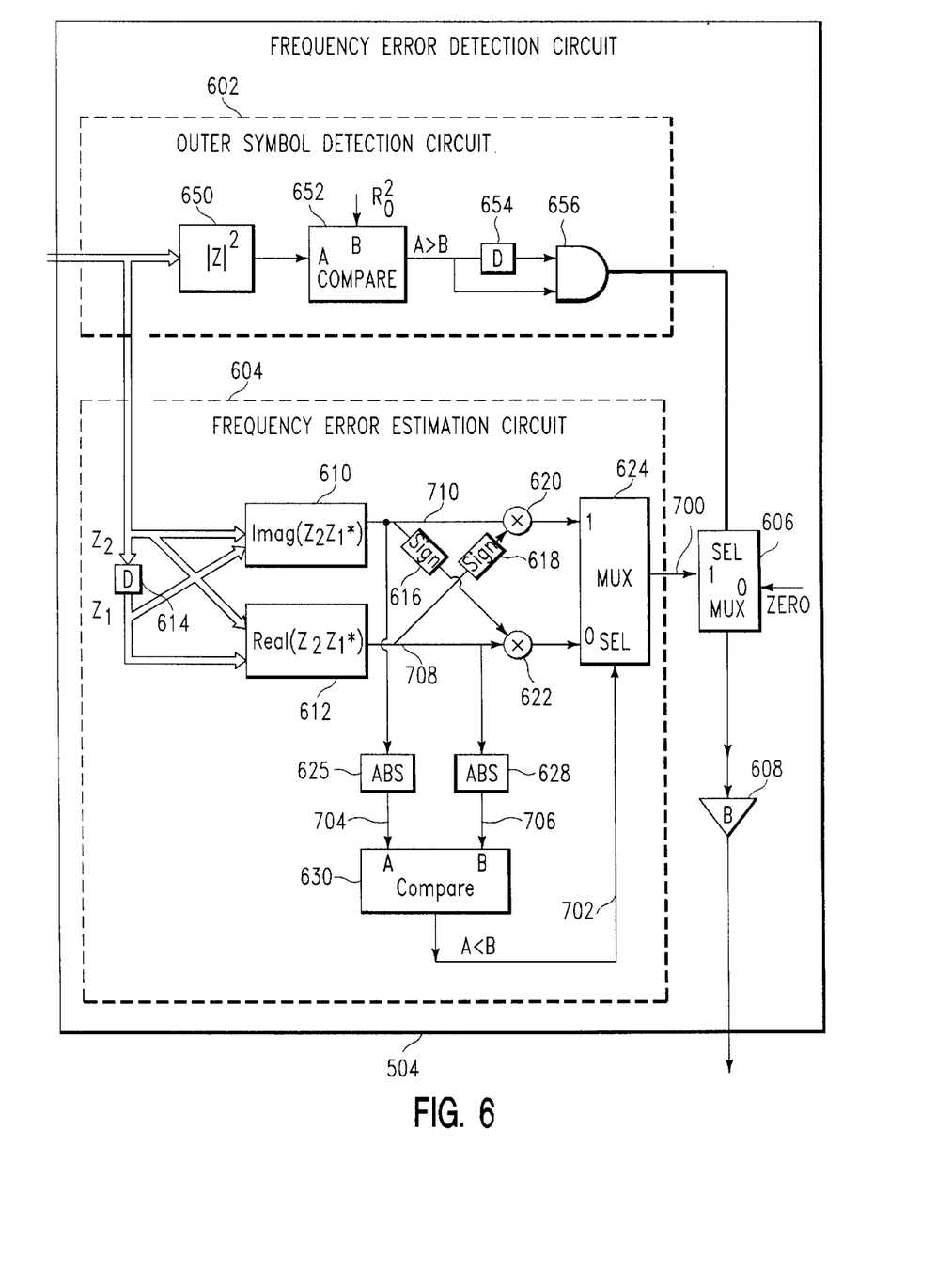
FIG. 6 is a block diagram of a frequency error detection circuit of the present invention suitable for use with the carrier recovery circuit of FIG. 5.

FIG. 6 illustrates the frequency error detection circuit 504 in greater detail. As illustrated in FIG. 6, the frequency error detection circuit 504 includes an outer symbol detection circuit 602, a frequency error estimation circuit 604, control logic in the form of a MUX 606, and a multiplier 608. The multiplier has a gain B and is used to insure that the output of the FED circuit 504 is properly scaled prior to being supplied to the input of the second order filter 310.

The operation of the various components of the FED circuit 504 will now be discussed in detail with reference to FIG. 7 which illustrates various signals generated by the frequency error detection circuit 504.

As illustrated in FIG. 6 the received de-rotated symbols are supplied to both the input of the outer symbol detection circuit 602 and to the input of the frequency error estimation circuit 604. The outer symbol detection circuit 602 includes a squaring circuit 650 coupled to a comparator 652. The comparator 652, in turn, has an output coupled to an input of a first unit delay element 654 and a first input of an AND gate 656. The AND gate 656 also has a second input coupled to the output of the first unit delay element 654.

During operation of the outer symbol detection circuit 602, the magnitude of each symbol is squared by the squaring circuit 650 and then compared by the comparator 652 to a threshold value which, when exceeded, indicates the presence of an outer symbol. The output of the comparator 652 is supplied to inputs of the delay element 654 and the AND gate 656. The AND gate 656 also receives the delayed output of the comparator 652. Accordingly, the output of the AND gate 656, which corresponds to the output signal generated by the outer symbol detection circuit 602, will be high when both the current symbol being processed and the immediately preceding symbol are determined to be outer symbols. The output of the outer symbol detection circuit 602, is supplied to a signal select control input of the MUX 606.

The frequency error estimation circuit 604 includes a plurality of elements including a second delay element 614, a first calculation circuit 610 for calculating the imaginary part resulting from the complex multiplication of a second received symbol $Z_2$ with the conjugate of a first received symbol $Z_1$, a second calculation circuit 612 for calculating the real part resulting from the complex multiplication of the second received symbol $Z_2$ with the conjugate of the first received symbol $Z_1$, first and second sign determining circuits 616, 618, first and second multipliers 620, 622, first and second absolute value circuits 625, 628, a comparator 630 and a MUX 624. The various elements are coupled together as illustrated in FIG. 6.

Because of the difficulty in calculating the actual phase error between symbols, an estimate of the phase error is generated, in accordance with the second embodiment of the present invention, as a function of the product of the second received symbol and the conjugate of the first received symbol.

Note that a measure of the phase difference between two consecutive symbols can be calculated as:

$Z_2 Z_1{}^*$ which equals $|Z_2 Z_1|(\cos \phi_{ae} + j \sin \phi_{ae})$ where $Z_1$ and $Z_2$ are the first and second symbols, in a pair of consecutive symbols, and $\phi_{ae}$ is the actual phase difference between them. An estimate of the phase difference between two symbols may be calculated as the imaginary part of the above expression, i.e., $\phi_e = Im(Z_2 Z_1^*)$ which equals $|Z_2 Z_1|(\sin(\phi_{ae}))$ in the case of small phase errors, $\sin(\phi_{ae})$ will approximate $\phi_{ae}$; accordingly for small phase errors, the estimated phase error He will approximate $|Z_2 Z_1|\phi_{ae}$.

Because of the rotational symmetry of a symbol constellation, it becomes ambiguous to consider the phase difference between $Z_1$ and $Z_2$ when the actual phase difference is greater than $\pi/4$ or less than $-\pi/4$. For example, consider that a phase difference of $+3\pi/8$ could be equivalently be a phase difference of $-\pi/8$. As a practical matter, when generating a phase error estimate to be used in adjusting the carrier recovery signal, it is desirable to consider the phase difference modulo $\pi/2$, that is, to determine the actual minimum possible phase error $\phi_{amin}$, within a range of $-\pi/4$ to $+\pi/4$, that could have produced the actual phase error. Assuming that the actual phase error was known, the actual minimum possible phase error could be obtained by adding or subtracting multiples of $\pi/2$ therefrom to translate the phase error into the range of $-\pi/4$ to $+\pi/4$.

That is, in order to get the calculated actual minimum phase error $\phi_{amin}$ if:

$-\pi/4 < \phi_{ae} < \pi/4$, add nothing to get $\phi_{amin}$;
$\pi/4 < \phi_{ae} < 3\pi/4$, subtract $\pi/2$ to get $\phi_{amin}$;
$3\pi/4 < \phi_{ae} < \pi$, subtract $\pi$ to get $\phi_{amin}$;
$-3\pi/4 < \phi_{ae} < -\pi/4$, add $\pi/2$ to get $\phi_{amin}$;
$-\pi < \phi_{ae} < -3\pi/4$, add $\pi$ to get $\phi_{amin}$;

Hence to calculate the actual minimum phase error when:

$-\pi/4 < \phi_{ae} < \pi/4$; calculate $\sin(\phi_{ae})$;
$\pi/4 < \phi_{ae} < 3\pi/4$; calculate $\sin(\phi_{ae} - \pi/2) = -\cos(\phi_{ae})$;
$3\pi/4 < \phi_{ae} < \pi$; calculate $\sin(\phi_{ae} - \pi) = -\sin(\phi_{ae})$;
$-3\pi/4 < \phi_{ae} < -\pi/4$; calculate $\sin(\phi_{ae} + \pi/2) = \cos(\phi_{ae})$;
$-\pi < \phi_{ae} < -3\pi/4$; $\sin(\phi_{ae} + \pi) = -\sin(\phi_{ae})$ Accordingly, the actual minimum desired phase error could be determined by calculating:

$\sin(\phi_{ae}) \text{sign}(\cos(\phi_{ae}))$ when $|\sin(\phi_{ae})| < |\cos(\phi_{ae})|$;
otherwise:
$-\cos(\phi_{ae}) \text{sign}(\sin(\phi_{ae}))$ when $|\sin(\phi_{ae})| > |\cos(\phi_{ae})|$.

EQUATION (1)

where: sign represents an operation which results in a value of $+1$ if the operand has a value $\geq 0$ and results in a value of $-1$ if the operand has a value $< 0$.

Figure 7:
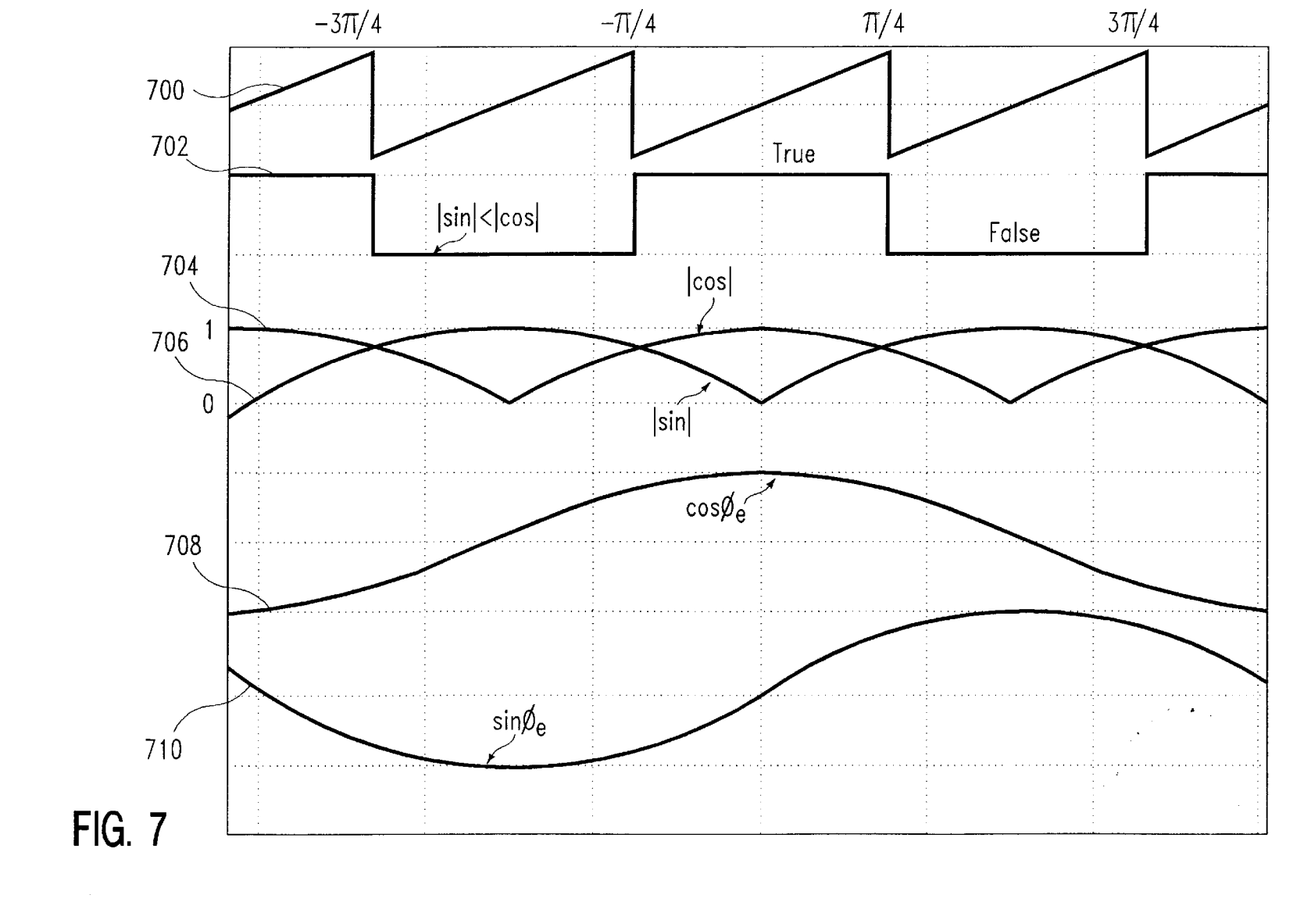
FIG. 7 illustrates signals generated at various points within the frequency error detection circuit illustrated in FIG. 6.

FIG. 7 illustrates the various values that would be assumed by the various signals:

$\phi_{amin}$ 700;
$|\sin(\phi_{ae})| < |\cos(\phi_{ae})|$ 702;
$|\sin(\phi_{ae})|$ 704;
$|\cos(\phi_{ae})|$ 706;
$\cos(\phi_{ae})$ 708;
$\sin(\phi_{ae})$ 710;

assuming the actual phase error($\phi_{ae}$) ranged from a value of $-\pi$ to $+\pi$.

In the implemented embodiment, rather than calculate the cosine and sine functions of the actual phase error, an estimate of the phase error is made by taking the real and imaginary parts of a complex multiplication operation with the understanding that:

$|Z_1 Z_2| \sin(\phi_{ae}) = Im(Z_2 Z_1^*)$; and
$|Z_1 Z_2| \cos(\phi_{ae}) = RE(Z_2 Z_1^*)$.

By substituting $Im(Z_2 Z_1^*)$ for $\sin(\phi_{ae})$ in Equation (1) and $RE(Z_2 Z_1^*)$ for $\cos(\phi_{ae})$ we have a way of estimating the minimum phase error that should be used for frequency correction purposes in a manner that can be easily determined. Note that the magnitude $|Z_1 Z_2|$ incorporated into the estimate of the phase error by use of the above estimation will merely act as a scalar value influencing how large a correction is to be made but not the direction of the correction. Accordingly, the estimated phase error between symbols representing the frequency error output by the frequency error estimation circuit 604 is calculated as:

frequency error = $Im(Z_2 Z_1^*) \text{sign}[Re(Z_2 Z_1^*)]$ when $|Im(Z_2 Z_1^*)| < |Re(Z_2 Z_1^*)|$; and
$-Re(Z_2 Z_1^*) \text{sign}[Im(Z_2 Z_1^*)]$ when $|Im(Z_2 Z_1^*)| > |Re(Z_2 Z_1^*)|$.

EQUATION 2

Points where approximations of the signals 700, 702, 704, 706, 708 and 710 can be found in the frequency error estimation circuit 604 are illustrated in FIG. 6 using the same reference numbers used to identify the actual signals in FIG. 7.

A review of the circuitry of the frequency error estimation circuit 604 shows how the frequency error signal determined by Equation 2 is calculated in the FIG. 6 embodiment.

In the FIG. 6 embodiment, the estimated frequency error signal generated by the frequency error estimation circuit 604 is supplied to a first input of the MUX 606. A second input of the MUX 606 receives zero as an input signal. The output of the outer symbol detection circuit 602 is coupled to a control input of the MUX 606. When the output of the outer symbol detection circuit 602 indicates that two consecutive outer symbols have been received, the output of the frequency error estimation circuit is supplied to the input of the multiplier 608 and amplified to form the output of the FED circuit 504. However, when the outer symbol detection circuit indicates that two outer symbols have not been received, the MUX is controlled to output the zero thereby resulting in the use of the frequency error estimation circuit when the frequency error estimates are believed to be accurate.

What is claimed is:

1. A method of processing a first signal including a sequence of symbols, the sequence of symbols including both inner and outer symbols, the method comprising the steps of:

receiving the sequence of symbols included in the first signal; and analyzing the received sequence of symbols to identify a set of consecutive outer symbols, the set of consecutive outer symbols including at least two sequentially received outer symbols one of which immediately follows the other outer symbol in the received sequence of symbols.

2. A method of processing a first signal including a sequence of symbols, the sequence of symbols including both inner and outer symbols, the method comprising the steps of:

receiving the sequence of symbols included in the first signal;

analyzing the received sequence of symbols to identify a set of consecutive outer symbols, the set of consecutive outer symbols including at least two sequentially received outer symbols one of which immediately follows the other outer symbol in the received sequence of symbols;

generating an estimate of the frequency error associated with an identified set of consecutive outer symbols; and utilizing the estimated frequency error to adjust the frequency of the first signal.

3. The method of claim 2, further comprising the step of:

determining if the estimated frequency error is ambiguous; and wherein the step of utilizing the estimated frequency error to adjust the frequency of the first signal is performed only when the estimated frequency error is determined to be non-ambiguous.

4. The method of claim 3, wherein the step of determining if the estimated frequency error is ambiguous includes the step of:

comparing the estimated frequency error to a first preselected threshold value.

5. The method of claim 4, wherein the step of analyzing the sequence of received symbols to identify a set of consecutive outer symbols includes the step of:

comparing the magnitude squared of each received symbol to a second preselected threshold value.

6. The method of claim 2, wherein the step of generating the estimate of the frequency error includes the steps of:

generating, as a function of a first sliced symbol value, a first phase error associated with a first symbol in the identified set of consecutively received outer symbols; and generating, as a function of a second sliced symbol value, a second phase error associated with a second symbol in the identified set of consecutively received outer symbols.

7. The method of claim 6, wherein the step of generating the estimate of the frequency error further includes the step of:

subtracting the second phase error from the first phase error to generate the estimated frequency error, the estimated frequency error thereby corresponding to a difference of phase errors.

8. The method of claim 2, wherein the frequency error estimate is generated as a function of the magnitude of first and second symbols in a set of identified symbols.

9. The method of claim 8, wherein the step of analyzing the first signal to identify a set of consecutive outer symbols includes the steps of:

comparing the magnitude squared of each received symbol to a preselected threshold value, the preselected threshold value being a value which will be exceeded when an outermost symbol in a constellation of symbols is received.

10. The method of claim 8, wherein the step of analyzing the first signal to identify a set of consecutive outer symbols includes the steps of:

comparing the magnitude squared of each received symbol in first signal to a preselected threshold value, the preselected threshold value being a value which will be exceeded when a non-inner most symbol in a constellation of symbols is received.

11. A frequency error detection circuit for generating a frequency error signal from a signal including a sequence of symbols, the symbols including inner and outer symbols, the apparatus comprising:

a signal input for receiving the signal;

a consecutive outer symbol detection circuit coupled to the signal input for detecting the receipt of a set of consecutively received outer symbols, the set of consecutively received outer symbols including at least two sequentially received outer symbols one of which immediately follows the other outer symbol in the received sequence of symbols; and a frequency error estimation circuit coupled to the signal input for generating a frequency error signal from consecutively received symbols.

12. The apparatus of claim 11, further comprising:

control logic coupled to the outer symbol detection circuit and the frequency error estimation circuit, the control logic being responsive to the outer symbol detection circuit to control the output of the frequency error signal, generated by the frequency error estimation circuit, from frequency error detection circuit.

13. The apparatus of claim 12, further comprising:

a frequency error ambiguity detector coupled to the frequency error estimation circuit and the control logic.

14. The apparatus of claim 11, wherein the frequency error estimation circuit includes means for subtracting phase error signals associated with first and second symbols in a set of consecutively received symbols.

15. The apparatus of claim 11, wherein the frequency error estimation circuit includes means for generating a frequency error estimate as a function of the magnitudes of two consecutively received symbols.

16. The apparatus of claim 15, wherein the means for generating a frequency error estimate includes means for generating the real and imaginary parts resulting from a complex multiplication of one received symbol in a set of consecutively received outer symbols with the complex conjugate of another received symbol in the same set of consecutively received outer symbols.

17. The apparatus of claim 16, wherein the means for generating a frequency error estimate further includes:

means for limiting the generated frequency error estimate to an unambiguous range.

18. A method, of processing a first signal including a sequence of symbols, the method comprising the steps of:

receiving the sequence of symbols included in the first signal;

identifying a set of consecutively received outer symbols, the set of consecutive outer symbols including at least two sequentially received outer symbols one of which immediately follows the other outer symbol in the received sequence of symbols; and generating an estimate of a frequency error associated with the identified set of consecutively received outer symbols in the received sequence of symbols.

19. The method of claim 18, wherein the step of generating a frequency error estimate includes the step of:

generating the real and imaginary parts resulting from a complex multiplication of one received symbol in the set of consecutively received symbols with the complex conjugate of another received symbol in the same set of consecutively received symbols.

20. The method of claim 19, wherein the step of generating a frequency error estimate further includes the step of:

limiting the generated frequency error estimate to a value within an unambiguous range of frequency error estimate values.

21. A carrier recovery circuit, comprising:

a signal de-rotator;

a phase detector coupled to the signal de-rotator;

a slicer module coupled to the signal de-rotator and the phase detector;

a filter coupled to the phase detector and to the signal de-rotator, the filter generating a signal used to control a frequency of an input signal to the de-rotator; and a frequency error detection circuit coupled to the de-rotator and the filter for generating a frequency error signal corresponding to an estimate of the frequency error associated with two consecutively received outer symbols.

22. The carrier recovery circuit of claim 21, wherein the frequency error detection circuit includes:

a consecutive outer symbol detection circuit for detecting the receipt of consecutively received outer symbols; and a frequency error estimation circuit for generating a frequency error signal from consecutively received symbols.

23. The carrier recovery circuit of claim 22, wherein the frequency error detection circuit further includes:

an ambiguity detector circuit for determining when the frequency error signal assumes a value which represents an ambiguous estimate of the frequency error.

24. The carrier recovery circuit of claim 21, wherein the frequency error detection circuit further includes:

control logic coupled to the frequency error detection circuit and the frequency error estimation circuit for controlling when a frequency error signal generated by the frequency error estimation circuit will be supplied to the filter.

25. A method of processing a first signal including a sequence of symbols, the sequence of symbols including both inner and outer symbols, the method comprising the steps of:

receiving the sequence of symbols included in the first signal; and analyzing, using an outer symbol detection circuit including an AND gate and a delay element, the received sequence of symbols to identify a set of consecutive outer symbols, the set of consecutive outer symbols including at least two sequentially received outer symbols one of which immediately follows the other outer symbol in the received sequence of symbols.

26. The method of claim 25, further comprising the steps of:

generating an estimate of the frequency error associated with an identified set of consecutive outer symbols; and utilizing the estimated frequency error to adjust the frequency of the first signal.

* * * * *